Aug. 9, 1966          D. A. LUPFER          3,264,709
ELECTRICAL COMPONENT AND METHOD OF MANUFACTURE
Filed July 29, 1963
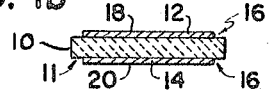
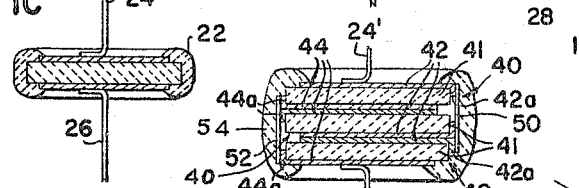
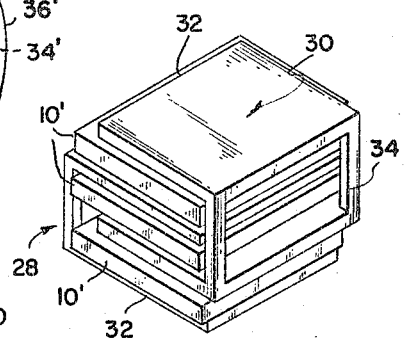
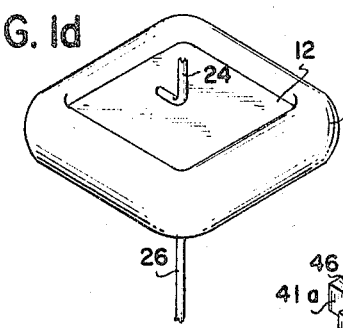
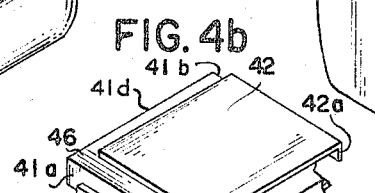
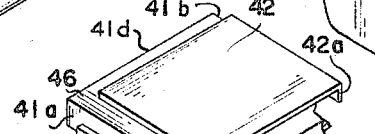
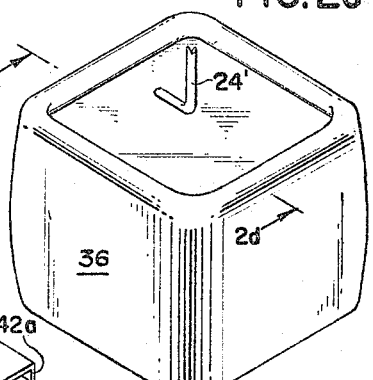
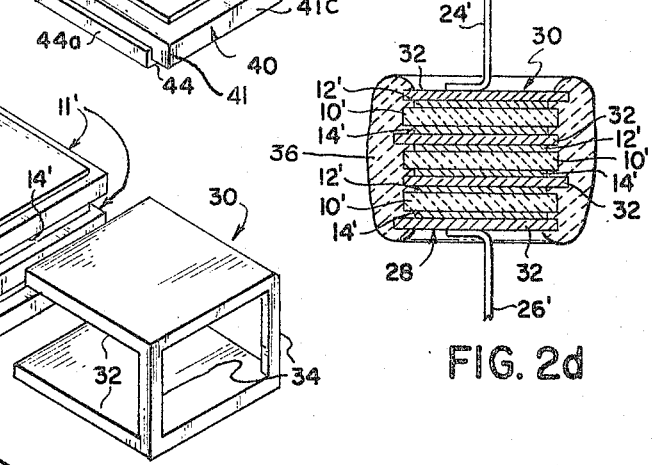
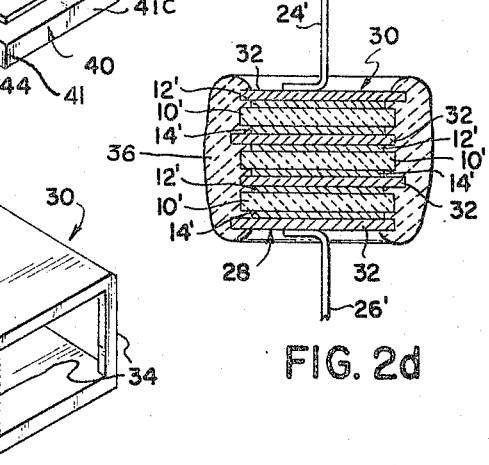
INVENTOR.
DAVID A. LUPFER
BY Hopgood & Calimafde
ATTORNEYS

United States Patent Office 3,264,709
Patented August 9, 1966

3,264,709
ELECTRICAL COMPONENT AND METHOD
OF MANUFACTURE
David A. Lupfer, Metuchen, N.J., assignor to Nytronics,
Inc., Phillipsburg, N.J., a corporation of New Jersey
Filed July 29, 1963, Ser. No. 298,020
9 Claims. (Cl. 29—25.42)

This invention relates to an electrical component and to an improved method of making the same and is particularly applicable to capacitors, although the principles taught herein may also be employed in the manufacture of other components.

In the prior art various constructions and methods of manufacture have been devised for improving the reliability of capacitors. In order to provide a capacitor which is reliable under severe environment conditions, it must be isolated from the detrimental effects of the various harmful elements of the atmosphere, such as for example solid substances in the form of minute particles and gases which may be encountered, particularly water vapor. This is generally accomplished by encapsulating the capacitor unit with a suitable coating or sealing it in a hermetic enclosure. For a variety of reasons, however, the capacitors made in accordance with prior constructions are either less reliable than desired or, if sufficiently reliable, are substantially larger than unsealed capacitors of the same capacitance and voltage rating so as to be unsatisfactory for certain applications where space and weight are important factors. In such applications the ultimate in space and weight savings of miniature and sub-miniature size capacitors cannot be realized if the feature of reliability is more important. Furthermore, in certain miniature capacitor constructions cracks and fissures tend to develop in the dielectric material as a result of sustained vibration, ultimately resulting in electrical breakdown between the capacitor plates, thereby further reducing reliability.

Accordingly, it is an object of this invention to provide an extremely reliable electrical component which is smaller in size than equivalent components of the prior art.

It is another object of the invention to provide a new method for making an electrical component.

It is a further object of the invention to make available a hermetically sealed capacitor of significantly smaller size than prior art capacitors having the same capacitance value and breakdown voltage rating.

Still a further object is to make available a hermetically sealed capacitor of extremely small dimensions which is more reliable than prior art capacitors of equivalent size in that the breakdown voltage characteristic will not tend to decrease as a result of vibration.

It is yet another object to provide a miniature capacitor of simple and economical construction to which leads may be affixed in a number of ways as desired either during manufacture of the capacitor unit or when connecting it in a circuit.

A still further object of the invention is to make available a hermetically sealed capacitor construction which requires a minimum volume of additional sealing material to effect the hermetic seal as contrasted with hermetic seal constructions heretobefore employed.

Another object is to provide a hermetically sealed capacitor of miniature size in which at least some of the capacitor plates may form a part of the air tight enclosure.

All of the objects, features and advantages of this invention and the manner of attaining them will become more apparent and the invention itself will be best understood by reference to the following description of an embodiment of the invention taken in conjunction with the accompanying drawings, in which FIGS. 1a–1d show in enlarged views a miniature capacitor unit in accordance with the principles of this invention and illustrating progressive stages of manufacture thereof;

FIG. 2a shows an enlarged partially exploded isometric view of a miniature capacitor construction in accordance with a further embodiment of the invention;

FIG. 2b is an assembled isometric view of the construction shown in FIG. 2a;

FIG. 2c is an isometric view of the capacitor construction of FIGS. 2a and 2b with a glass coating applied thereto and leads attached;

FIG. 2d is a view in cross section of the capacitor shown in FIG. 2c, taken on line 2d—2d thereof;

FIG. 3 illustrates a further embodiment of the invention;

FIG. 4a is a side view in cross section illustrating a still further embodiment of the invention; and FIG. 4b shows an isometric view, partly broken away, of one of the units forming a part of the construction of FIG. 4a.

In accordance with one aspect of the invention, there is provided a substrate of dielectric material upon which is deposited a metallic layer on opposite sides thereof. These layers in one embodiment form the plates of the capacitor and are characterized in that they each constitute an effective barrier to the passage of gas and water molecules. A coating of glass which extends from one metallic layer to the other around the periphery of the substrate is also provided and is selected to have a thermal coefficient of expansion substantially matching that of the substrate. This coating cooperates with the metallic layers to thereby provide a hermetic enclosure for the capacitor. Leads may then be connected to the capacitor plates.

In another embodiment of the invention a plurality of individual capacitor units are assembled together in stacked or sandwich arrangement and selected plates are interconnected to form the desired capacitance value. Leads may then be connected to the outer metallic plates, which form a part of the capacitor.

The invention also comprises the method for making the capacitors described herein and includes in its broadest aspects providing a layer of metallic material on opposite sides of a thin substrate of dielectric material to thereby form an individual capacitor unit. This unit is then baked at a predetermined temperature for a predetermined period of time to thereby bake out any occluded gases and trapped water molecules. If desired a number of such units may then be assembled to form the finished capacitor, selected metallic layers being interconnected to form two sets of plates. A coating of glass is then fired on the assembly which extends from one outer metallic layer to the other and also extends around the periphery of the substrates. Finally leads may be connected to the capacitor or if desired connections to the plates may be made when the capacitor is connected into the circuit with which it is to be used.

Referring now to the drawings, there is shown in cross section in FIG. 1a a substrate or separator in the form of a thin wafer 10 of suitable dielectric material upon which thin metallic film layers 12 and 14 of suitable conductive material are deposited to thereby form capacitor plates. The dielectric material may be a rectangular or circular wafer, or any other suitable shape, such as for example cylindrical and of course may also be of any suitable material, such as for example ceramic. For illustration purposes only the drawings show the dielectric material wafer 10 as being rectangular in shape. The metallic layers 12 and 14 may be deposited upon the ceramic wafer by any suitable process, such as for example evaporation, sputtering, pyrolitic deposition, displacement from solution, spraying, or painting. The metallic layers 12 and 14 may be extremely thin, such as of the order of .001", and may be made from various different materials such as for example silver, platinum, copper, etc., or suitable alloys.

It will be noted that the metallic layers 12 and 14 in FIG. 1a extend to the edges of the wafer 10. Such a construction is disadvantageous in that electrical breakdown is more easily produced between the plates at the edges of the assembly through the air than through the dielectric 10. Additionally, microscopic cracks or fissures may be produced at the edge of the ceramic during the ceramic cutting process, resulting in a lower voltage breakdown characteristic in such areas. Accordingly, the peripheral edges of the metallic layers 12 and 14 are selectively removed so that these edges extend to a predetermined distance from the edges of the ceramic wafer 10 as at 16 in FIG. 1b. This can be achieved by masking the inner portions of these layers which it is desired to retain, and etching or sand blasting the unmasked edges by techniques well known in the art. The layers 12 and 14 could also be deposited as shown in FIG. 1b if desired, by suitably masking the ceramic 10 before deposition of these layers. This construction produces a capacitor having a superior voltage breakdown rating. This rating is still further enhanced by means of a glass coating in accordance with the teaching of the invention, as will appear.

The ceramic substrate or wafer 10 with the metallic layers 12 and 14 thereon is next subjected to a baking operation to remove any trapped or occluded gas and water content. Such baking is preferably done in an oxygen-rich atmosphere when the layers 12 and 14 are formed with a paint-on application in which the solution contains metal and glass particles which is one preferred method of applying these layers. With such an atmosphere good adherence of the metallic layers 12 and 14 to the wafer 10 is achieved, which is not obtained by using a reducing atmosphere. Other suitable atmospheres which can be employed are carbon dioxide and steam. While various baking schedules may be employed, I have found that baking up to a temperature range of 600–800° C. for approximately one-half hour is quite satisfactory. Where the paint-on layer technique is used, the particular temperature will depend to some degree upon the type of glass particles used in the metal paint.

It has been observed that many of the materials from which it is desirable to form the metallic layers 12 and 14 are not capable of preventing an effective barrier to the passage of molecules, such as for example molecules of water in vapor form. This may be due either to the physical structure of the material used for the layers 12 and 14, or the extreme thinness of the layer or a combination of these factors. I have discovered that the external surface of most these materials which are suitable for forming the metallic layers 12 and 14 can be altered by suitable mechanical working to thereby produce a continuous skin at the outer surfaces 18 and 20 of these layers which is an effective barrier to the passage of the molecules. Although a variety of mechanical teachniques can be employed to form this barrier, one method which I have employed very successfully is to burnish the outer surfaces 18 and 20 of the metallic layers 12 and 14. Satisfactory burnishing can be achieved with a number of materials and techniques, one of these being for example with a rotating wheel of felt, leather, cloth, or other suitable material. The amount of burnishing necessary will of course vary somewhat with the physical structure of the material of which the layers 12 and 14 are formed. The most satisfactory technique for any given material can be readily determined with a moderate amount of experimentation. It should be noted that if a paint-on type of metallic layer material is employed, the burnishing technique will produce an effective barrier only if the paint includes a sufficient content of metallic particles. The minimum content necessary will of course depend upon the type of metal involved. The precise nature of the physical change brought about by the burnishing of the metallic surface is not completely known in detail at this time, however, the result is to produce a continuous uninterrupted molecular barrier which prevents the passage of gas and water molecules and therefore can serve to provide a hermetic seal for the capacitor, as will appear.

Alternate methods of producing an effective barrier to the passage of gas and water molecules may also be employed to produce the construction described. Thus, burnishing or other mechanical working of the metallic layers 12 and 14 may be dispensed with by forming these layers in multiple applications, i.e. by repeated applications of one layer upon another. A thin preformed metal sheet, impervious to the passage of molecules, could also be placed over each of the metallic layers 12 and 14 and welded to these layers in which case each layer may be considered as a single metallic layer, although made up of a thin film portion and a metal sheet portion.

The exposed edges of the assembly shown in FIG. 1b are next provided with a suitable coating of glass 22 as seen in FIGS. 1c and 1d. This coating 22 should extend from the surface 18 of the upper metallic layer 12 to the surface 20 of the lower metallic layer 14 and should make a hermetic seal around the entire periphery of the assembly, as shown in FIG. 1d. The glass should be a type having a thermal coefficient of expansion matching that of the ceramic wafer 10 so that cracking will not occur due to temperature variations. In this construction it will be seen that the metallic layers 12 and 14, which form the capacitor plates, also cooperate with the glass coating 22 to thereby form a hermetic seal or housing for the capacitor.

The glass coating 22 also serves an additional useful and important purpose. It is well known that ceramics contain minute voids, crevices and cracks which serve as paths for the entry of moisture and which also result, when used as a capacitor dielectric, in a lowering of the voltage breakdown characteristic of the capacitor. In accordance with the teaching of this invention the glass of the coating 22, when in a molten condition as it is being applied to the assembly of FIG. 1c, will flow into the voids, crevices, and cracks in the outer edges of the ceramic wafer 10. Thus, a dielectric material of excellent insulating properties is provided in the voids, crevices and cracks at and near the edge of the ceramic wafer 10 which substantially improves the voltage breakdown characteristics of the capacitor. Additionally the glass which flows into these areas makes a solid bond with the ceramic wafer in it regions of contact therewith and has the effect of preventing enlargement of existing cracks and crevices which might otherwise tend to develop in applications where the capacitor is exposed to vibrations or other mechanical stresses. It will thus be seen that this feature not only improves the breakdown voltage characteristic of the capacitor but also the reliability of the capacitor since this characteristic will be less apt to change as the capacitor is subjected to mechanical forces.

After coating the capacitor unit with the glass coating 22, suitable leads 24 and 26 as seen in FIGS. 1c and 1d may be appropriately connected as for example, by soldering or welding to the layers 12 and 14, respectively. If desired, however, the capacitor unit may be considered complete without the leads for certain applications, in which case the leads may be connected to the plates when the unit is installed in the apparatus in which it is to be used.

Referring now to FIG. 2a, there is shown a portion of a partially assembled capacitor structure comprising three capacitor units 11' of the type indicated by the numeral 11 in FIG. 1b. Each of these units is first made by providing metallic film layers 12' and 14' on the ceramic wafers 10' and etching or sand blasting the outer edges of these layers in accordance with the method described above. The units 11' are then baked and the external surfaces of each of the layers 12' and 14' may also be burnished, as outlined above. The burnishing is not absolutely necessary in this construction but is preferable as it will facilitate welding the layers 12' and 14' to the metallic sheet members 28 and 30 which form a part of the construction shown in FIG. 2. Each of these metallic members 28 and 30 comprises two leaves 32 connected by means of tabs 34, see FIGS. 2a and 2b. This capacitor is made by assembling the upper and intermediate capacitor units 11' of FIG. 2a within the region between the upper metallic member 30. The lower metallic member 28 is then positioned so as to embrace the lower and intermediate units 11' between its leaves 32 to produce the construction shown in FIG. 2b. The assembly is then heated to a temperature sufficient to weld the leaves 32 of the metallic members 28 and 30 to the metallic layers 12' and 14' with which they are in contact. In similar manner, as in FIG. 1, a coating of glass 36 is applied, as shown in FIGS. 2c and 2d, around the entire periphery or edge of the capacitor assembly. This glass coating 36 cooperates with the upper leaf of the metallic member 30 and the lower leaf of the metallic member 28 to provide a hermetically sealed capacitor with a minimum of material in addition to that required for the capacitor element alone, and eliminates the necessity for the separate encapsulating enclosures and the large mass of encapsulting material now conventional in the art. Leads 24' and 26' may then be applied if desired, as shown in FIGS. 2c and 2d.

FIG. 3 shows a capacitor made by utilizing only two of the units 11' in conjunction with one of the metallic sheet members such as 30'. In this construction however a suitable connection 38 would have to be made to the intermediate plate 39 before the glass coating 36' is applied so that electrical connection to this plate can be effected after manufacture of the capacitor. The other lead can be connected to either leaf 32' of the metallic member 30'.

Referring now to FIG. 4a there is shown a further alternative construction which employs in stacked or sandwiched relationship a plurality of individual capacitor units 40 similar to the units 11 of FIG. 1b but modified as described below. In this construction each of the ceramic wafers 41 is provided with a layer 42 and also a layer 44 on the opposite side of the wafer. The layers on opposite sides of any given wafer 41 are staggered as seen in FIGS. 4a and 4b. Referring particularly now to FIG. 4b it will be seen that the layer 42 is recessed from one edge 41a of the wafer 41 as at 46 and has a portion 42a which overlaps onto the opposite edge 41b of the wafer; the layer 44 is recessed from the opposite edge 41b and has a portion 44a which overlaps onto the one edge 41a of the wafer 41. Each of the layers 42 and 44 are of course also recessed from the edge 41c and 41d of the wafer 41 to improve the voltage breakdown characteristic as discussed above.

The units 40 are next baked and the layers 42 and 44 are then burnished, all as described above with respect to FIG. 1. The burnishing facilitates the welding of adjacent intermediate layers of the assembly of FIG. 4a and also enables the production of a hermetic seal by the outer layers as will be appreciated. After burnishing, a plurality of individual units constructed as shown in FIG. 4b are then assembled so that adjacent layers 42 contact one another and also so that adjacent layers 44 contact one another, as shown in FIG. 4a. The assembly is then heated to a temperature sufficient to weld the adjacent layers 42 together and the adjacent layers 44 together. Suitable conductors 50 and 52 are then provided to connect together, respectively, the layers 42 and 44 by means of the overlapping portions 42a and 44a respectively, by any suitable method such as for example welding or soldering.

Finally the glass coating 54 may be applied around the periphery or edge of the assembled unit with the outer layers 42 and 44 cooperating with this coating to form a hermetic seal. As described above, this glass coating also tends to fill in any cracks, crevices or voids at the edges of the ceramic wafers 41, thereby substantially improving the voltage breakdown rating and the reliability of the capacitor unit. Wires 24' and 26' may then be connected to the outer plates 42 and 44 in FIG. 4a, or connections to these plates may be made when the device is connected into the circuit with which it is to be used.

A series of capacitors have been made using the above teachings. These have included both individual units and multiple plate capacitors connected electrically in parallel as described to form higher capacitance. The glass and continuous metal system served as an excellent protection against moisture in all cases in tests which were performed by immersing units made in this fashion in water for a minimum of 24 hours. These capacitors exhibited excellent characteristics as shown by D.C. resistivity, A.C. capacitance, and dielectric strength. Capacitors made by conventional methods without the molecular barrier-glass coating described could not pass such a test.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. The method of making a capacitor comprising the steps of
    depositing a layer of metallic material on opposite sides of a thin substrate of dielectric material,
    limiting the coverage of said layers so as to extend outwardly to a predetermined distance from the edges of said substrate,
    baking the substrate containing said layers to remove gas and water molecules therefrom,
    providing a barrier at the outer surfaces of said layers which is impervious to the passage of gas and water molecules,
    and providing a coating of glass extending from one of said layers to the other around the periphery of said substrate, whereby a capacitor is formed in which said glass coating cooperates with said barriers to form a hermetic enclosure for said capacitor.

2. The invention described in claim 1 wherein said barriers are produced by mechanically working the outer surfaces of said layers.

3. The invention described in claim 2 wherein said mechanical working is produced by burnishing said outer surfaces.

4. The invention described in claim 1 wherein each of said layers is formed by first depositing a metallic film on the substrate and then providing an overlying thin sheet of metal between the said film and said glass coating.

5. The invention described in claim 1 which further comprises the step of connecting a lead wire to each of said layers.

6. The method of making a stacked capacitor including a plurality of plates in combination with a plurality of substrates of dielectric material which includes the steps of
    providing metallic layers on the opposite sides of said substrates to thereby form individual capacitor units,
    limiting the areas of said layers so as to extend outwardly to predetermined distances from the edges of said substrates, baking said individual capacitor units to remove gas and water molecules therefrom, assembling said capacitor units into stacked relationship with one another, heating said assembled units to weld them to one another, providing barriers at the outer surfaces of the layers at the ends of said stack which are impervious to the passage of gas and water molecules, interconnecting a first group of selected layers to thereby form one electrical plate of said capacitor, interconnecting a second group of selected layers to thereby form the other electrical plate of said capacitor, and providing a coating of glass from the barrier on one end of said stack to the barrier on the other end of said stack extending around the periphery of said substrates, whereby a capacitor is formed in which said glass coating cooperates with said barriers to form a hermetic enclosure for said capacitor.

7. The invention described in claim 6 wherein said barriers are produced by mechanically working the outer surfaces of the layers at the ends of said stack.

8. The invention described in claim 7, wherein said mechanical working is produced by burnishing said outer surfaces.

9. The invention described in claim 6 wherein each of the end layers of the stack is formed by first depositing a metallic film on the substrate and then providing an overlying thin sheet of metal between said film and said glass coating.

References Cited by the Examiner
UNITED STATES PATENTS

| | | | |
|---|---|---|---|
| 2,119,115 | 5/1938 | Rohnfeld | 317—242 |
| 2,142,705 | 1/1939 | Tarr | 317—242 |
| 3,149,399 | 9/1964 | Sprague | 29—25.42 |
| 3,151,382 | 10/1964 | McHugh | 29—25.42 |

RICHARD H. EANES, JR., *Primary Examiner.*